(12) United States Patent
Sprouse et al.

(10) Patent No.: US 7,117,674 B2
(45) Date of Patent: Oct. 10, 2006

(54) CATALYTIC COMBUSTOR AND METHOD FOR SUBSTANTIALLY ELIMINATING VARIOUS EMISSIONS

(75) Inventors: Kenneth M Sprouse, Northridge, CA (US); Shahram Farhangi, Woodland Hills, CA (US); Michael P Moriarty, Simi Valley, CA (US); David R Matthews, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 138 days.

(21) Appl. No.: 10/729,595

(22) Filed: Dec. 5, 2003

(65) Prior Publication Data

US 2006/0156729 A1 Jul. 20, 2006

Related U.S. Application Data

(63) Continuation-in-part of application No. 10/397,394, filed on Mar. 26, 2003, now abandoned, which is a continuation-in-part of application No. 10/189,711, filed on Jul. 3, 2002, now abandoned, and a continuation-in-part of application No. 10/120,268, filed on Apr. 10, 2002, now abandoned.

(51) Int. Cl.
*F23R 3/40* (2006.01)
(52) U.S. Cl. ........................................... 60/723
(58) Field of Classification Search .................. 60/723, 60/777
See application file for complete search history.

(56) References Cited

U.S. PATENT DOCUMENTS

| 4,047,877 | A | * | 9/1977 | Flanagan | 60/723 |
| 4,197,701 | A | * | 4/1980 | Boyum | 60/777 |
| 4,731,989 | A | | 3/1988 | Furuya et al. | |
| 4,870,824 | A | | 10/1989 | Young et al. | |
| 4,926,645 | A | * | 5/1990 | Iwai et al. | 60/723 |
| 5,000,004 | A | * | 3/1991 | Yamanaka et al. | 60/723 |
| 5,003,768 | A | * | 4/1991 | Kappler et al. | 60/723 |
| 5,281,128 | A | | 1/1994 | Dalla Betta et al. | |
| 5,309,537 | A | | 5/1994 | Moriarty | |
| 5,461,864 | A | | 10/1995 | Betta et al. | |

(Continued)

FOREIGN PATENT DOCUMENTS

EP      0 304 707      5/1988

(Continued)

OTHER PUBLICATIONS

Catalytica, How it Works, http://www.catalyticaenergy.com/xonon/how_it_works.html, printed Feb. 6, 2002.

(Continued)

*Primary Examiner*—Michael Koczo, Jr.
(74) *Attorney, Agent, or Firm*—Harness Dickey & Pierce P.L.C.

(57) ABSTRACT

A combustor for a gas powered turbine which employs a heat exchanger and a catalyst to combust a fuel without the emission of undesired chemical species. A gas powered turbine requires expanding gases to power the turbine blades. Fuel is combusted to produce the required gases. A catalyst is employed to lower the combustion temperature of the fuel. The catalyst is placed on a set of tubes in the heat exchanger such that a portion of the thermal energy may be transferred to the air before it engages the catalyst. After encountering the catalyst, the combusted fuel increases the temperature of the air to an auto-ignition temperature so that no other ignition source is needed to combust additional fuel.

16 Claims, 8 Drawing Sheets

U.S. PATENT DOCUMENTS

| | | |
|---|---|---|
| 5,511,972 A | 4/1996 | Dalla Betta et al. |
| 5,512,250 A | 4/1996 | Dalla Betta et al. |
| 5,518,697 A | 5/1996 | Dalla Betta et al. |
| 5,577,906 A | 11/1996 | Hanakata et al. |
| 5,709,077 A | 1/1998 | Beichel |
| 5,715,673 A | 2/1998 | Beichel |
| 5,899,679 A | 5/1999 | Euzen et al. |
| 5,956,937 A | 9/1999 | Beichel |
| 5,970,702 A | 10/1999 | Beichel |
| 6,170,264 B1 | 1/2001 | Viteri et al. |
| 6,174,159 B1 | 1/2001 | Smith et al. |
| 6,192,688 B1 | 2/2001 | Beebe |
| 6,202,402 B1 | 3/2001 | Sattelmayer |
| 6,205,768 B1 | 3/2001 | Dibble et al. |
| 6,358,040 B1 | 3/2002 | Pfefferle et al. |
| 6,415,608 B1 | 7/2002 | Newburry |
| 6,584,760 B1 | 7/2003 | Lipinski et al. |
| 6,619,043 B1* | 9/2003 | Bruck et al. .................. 60/723 |
| 2002/0139119 A1 | 10/2002 | Touchton et al. |
| 2003/0056519 A1 | 3/2003 | Newberry |
| 2003/0192319 A1* | 10/2003 | Sprouse et al. ................ 60/723 |
| 2004/0003598 A1* | 1/2004 | Farhangi ...................... 60/723 |

FOREIGN PATENT DOCUMENTS

| | | |
|---|---|---|
| EP | 0 889 289 | 6/1998 |
| JP | 58-179730 | 10/1983 |
| JP | 59-107119 | 6/1984 |
| JP | 60-66022 | 4/1985 |
| JP | 60-64131 | 12/1985 |
| WO | WO 02/27243 | 4/2002 |

OTHER PUBLICATIONS

Catalytica, How it Works, http://www.catalyiticaenergy.com/xonon/how_it_works1.html, printed Feb. 6, 2002.

* cited by examiner

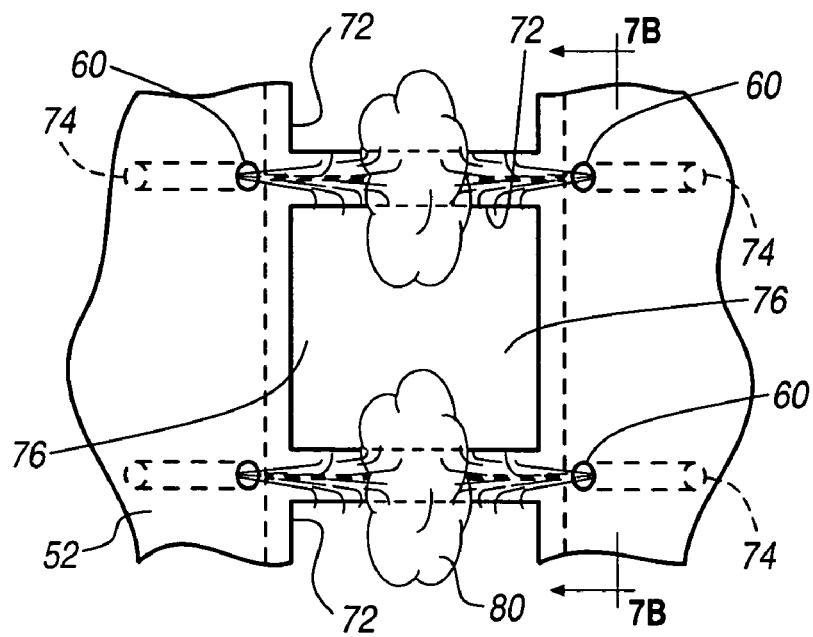 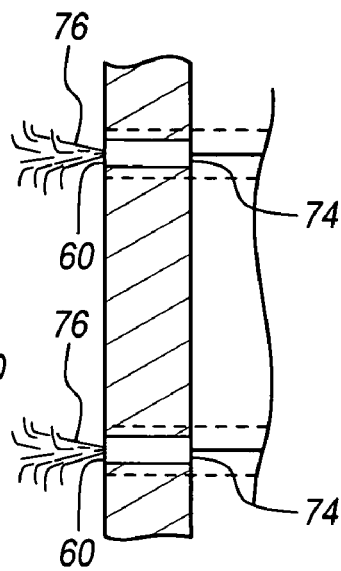
FIGURE- 7A  FIGURE- 7B
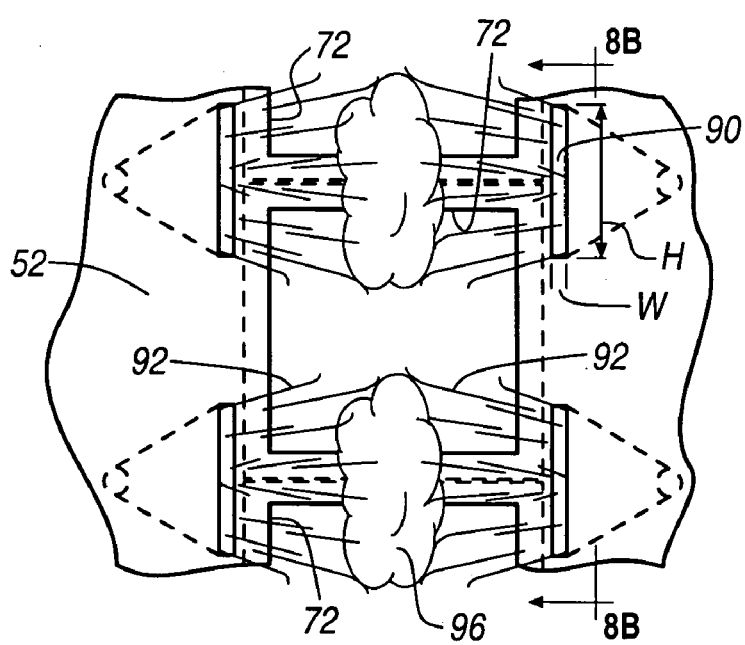 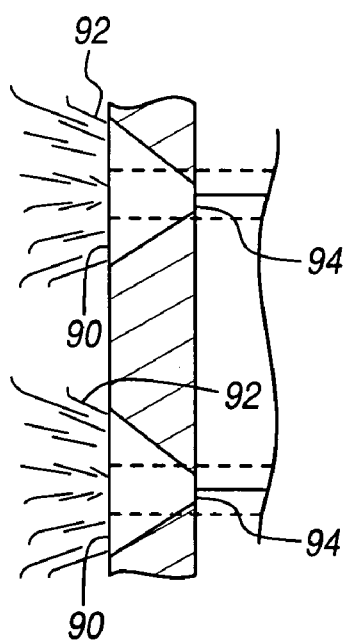
FIGURE- 8A  FIGURE- 8B

CATALYTIC COMBUSTOR AND METHOD FOR SUBSTANTIALLY ELIMINATING VARIOUS EMISSIONS

CROSS-REFERENCE TO RELATED APPLICATIONS

This application is a continuation-in-part of U.S. Pat. Application No. 10/397,394, entitled "A CATALYTIC COMBUSTOR AND METHOD FOR SUBSTANTIALLY ELIMINATING NITROUS OXIDE EMISSIONS" filed on Mar. 26, 2003 now abandoned; which is a continuation-in-part of both U.S. patent application No. 10/189,711, entitled "INJECTOR APPARATUS AND METHOD FOR COMBUSTING A FUEL FOR A GAS POWERED TURBINE" filed on Jul. 3, 2002 now abandoned; and U.S. patent application No. 10/120,268, entitled "A CATALYTIC COMBUSTOR AND METHOD FOR SUBSTANTIALLY ELIMINATING NITROUS OXIDE EMISSIONS" filed on Apr. 10, 2002 now abandoned. The disclosures of the above applications are incorporated herein by reference.

FIELD

The present invention relates generally to gas powered turbines for generating power, and more particularly to a low nitrous oxide emission combustion system for gas powered turbine systems.

BACKGROUND

It is generally known in the art to power turbines with gases being expelled from combustion chambers. These gas powered turbines can produce power for many applications such as terrestrial power plants. In the gas powered turbine a fuel is combusted in an oxygen rich environment. The fuel may be any appropriate fuel such as a liquid or gas. Exemplary fuels include hydrocarbons (for example methane or kerosene) or hydrogen. Generally, these combustion systems may emit undesirable compounds such as nitrous oxide compounds (NOX) and carbon containing compounds. It is generally desirable to decrease various emissions as much as possible so that selected compounds may not enter the atmosphere. In particular, it has become desirable to reduce NOX emissions to a substantially low amount. Emissions of NOX are generally desired to be near zero, and are accepted to be near or at zero, if they are equal to or less than about one part per million volume of dry weight emissions.

In a combustion chamber fuel, such as methane, is combusted in atmospheric air where temperatures generally exceed about 1427° C. (about 2600° F.). When temperatures are above 1427° C., the nitrogen and oxygen compounds, both present in atmospheric air, undergo chemical reactions which produce nitrous oxide compounds. The energy provided by the high temperatures allows the breakdown of dinitrogen and dioxygen, especially in the presence of other materials such as metals, to produce NOX compounds such as $NO_2$ and NO.

It has been attempted to reduce NOX compounds by initially heating the air before it enters the combustion chambers to an auto-ignition temperature. If the air enters the combustion chamber at an auto-ignition temperature, then no flame is necessary to combust the fuel. Auto-ignition temperatures are usually lower than pilot flame temperatures or the temperatures inside recirculation flame holding zones. If no flame is required in the combustion chamber, the combustion chamber temperature is lower, at least locally, and decreases NOX emissions. One such method is to entrain the fuel in the air before it reaches the combustion chamber. This vitiated air, that is air which includes the fuel, is then ignited in a pre-burner to raise the temperature of the air before it reaches the main combustion chamber. This decreases NOX emissions substantially. Nevertheless, NOX emissions still exist due to the initial pre-burning. Therefore, it is desirable to decrease or eliminate this pre-burning, thereby substantially eliminating all NOX emissions.

Although the air is heated before entering the main combustion chamber, it may still be ignited in the combustion chamber to combust the remaining fuel. Therefore, an additional flame or arc is used to combust remaining fuel in the main combustion chamber. This reduces the temperature of the igniter, but still increases the temperature of the combustion chamber. In addition, no fuel is added to the air as it enters the combustion chamber. Rather all the fuel has already been entrained in the air before it enters the combustion chamber to be combusted. This greatly reduces control over where combustion occurs and the temperature in the combustion chamber Other attempts to lower NOX emissions include placing catalysts in catalytic converters on the emission side of the turbines. This converts the NOX compounds into more desirable compounds such as dinitrogen and dioxygen. These emission side converters, however, are not one hundred percent efficient thereby still allowing NOX emissions to enter the atmosphere. The emission converters also use ammonia $NH_3$, gas to cause the reduction of NOX to $N_2$. Some of this ammonia is discharged into the atmosphere. Also, these converters are expensive and increase the complexity of the turbine and power production systems. Therefore, it is also desirable to eliminate the need for emission side catalytic converters.

SUMMARY

The present invention is directed to a combustor and a combustion chamber for a gas powered turbine. A heat exchanger and a catalyst that may combust a first portion of fuel intermixed with air without the production of undesired chemical species. The gas powered turbine requires expanding gases to power the turbine fans or blades. Fuel is generally combusted to produce the required gases. A catalyst is employed to lower the combustion temperature of the fuel. The catalyst is disposed in a set of tubes in a heat exchanger such that a portion of the thermal energy may be transferred to the air before it engages the catalyst. After encountering the catalyst, the fuel that was combusted increases the temperature of the air to an auto-ignition temperature so that no other ignition source is needed to combust additional fuel added later. Therefore, as the air exits the heat exchanger, it enters a main combustion chamber, is mixed with a second portion of fuel where it is auto-ignited and burned.

According to various embodiments of the present invention, a combustion system for use in a gas powered turbine which combusts a fuel in the presence of air while substantially eliminating nitrous oxide emissions is disclosed. The system includes a pre-heater to heat compressed air that may form a hypergolic air. An injector plate injects a fuel into the hypergolic air. An injector port, defined by the injector plate, provides the fuel to the hypergolic air before a substantial portion of the fuel combusts. Substantially all the fuel provided through the injector port may reach its hypergolic temperature at substantially the same time.

According to various embodiments of the present invention, a gas powered turbine is disclosed that includes a combustor. The gas powered turbine includes a compressor that produces compressed atmospheric air to provide an oxidizer for the gas powered turbine. A combustion system mixes and combusts a fuel injected into the compressed atmospheric air to produce an expanding gas. A turbine fan is powered by the expanding gases.

The combustion system may include a pre-heat area, a first fuel line, a second fuel line, and an injector system. The first fuel line supplies a first portion of fuel to the compressed atmospheric air which is combusted in the pre-heat area to heat the compressed atmospheric air to a hypergolic temperature so as to produce hypergolic air. The second fuel line supplies a second portion of fuel to the hypergolic air. The injector system provides the second portion of fuel to the hypergolic air before any substantial portion of the second portion of fuel combusts. In addition, substantially all of the second portion of fuel combusts at substantially the same time such that the turbine emits substantially near-zero nitrous oxide compounds.

According to various embodiments, a method of combusting a fuel for a gas powered turbine in the presence of atmospheric air while substantially eliminating the emission of nitrous oxide compounds is disclosed. The method includes providing a pre-heater. A first fuel-air mixture is formed by mixing a first portion of the fuel and the air. An auto-ignition air stream is produced by combusting the first fuel-air mixture. A second portion of the fuel is then added to the auto-ignition air stream. The second portion of fuel is then mixed with the auto-ignition air stream before substantially any of the second portion of fuel combusts.

According to various embodiments, a combustion system for use in a turbine may combust a fuel in the presence of an oxidizer, which substantially eliminates nitrous oxide emissions. The combustion system comprises a heat exchanger. The heat exchanger may include at least one catalyst tube extending along a first axis and at least one cooling tube extending along a second axis. The axes of the catalyst tube and the cooling tube are generally parallel. The catalyst tube is in thermal contact with the cooling tube. The air is adapted to first flow through the cooling tube and then through the catalyst tube. A catalyst may be placed inside the catalyst tube. The catalyst may combust the fuel with the air. The air may flow past and/or through the catalyst tube and through the cooling tube, wherein the air receives thermal energy from the catalyst tube as the air flows through the cooling tube and past the catalyst tube.

According to various embodiments, a turbine system includes a compressor that may produce compressed atmospheric air; a combustion system for mixing and combusting a fuel in the compressed atmospheric air to produce expanding gases; and a turbine that may be powered by the expanding gases. The combustion system comprises a first fuel supply to supply fuel to the compressed atmospheric air. The combustion system also includes a heat exchanger comprising at least one catalyst tube comprising a catalyst coated on the inside of the catalyst tube, wherein the compressed air and the fuel flow through the catalyst tube. A second fuel supply supplies fuel to the compressed atmospheric air after the compressed atmospheric air has passed through the catalyst tube.

Various embodiments include a method of combusting a fuel in the presence of atmospheric air while substantially achieving near-zero nitrous oxide compound emissions. The method includes providing a heat exchanger comprising hollow tubes; placing a catalyst on at least a portion of the interior of the hollow tubes; forming a first fuel-air mixture by mixing a first portion of the fuel and the air; producing a auto-ignition air stream by combusting the first fuel-air mixture by contacting the first fuel-air mixture with the catalyst; and heating the air by transferring a portion of the thermal energy from the hollow tubes to the air. Additional fuel may be combusted in the auto-ignition air stream without the application of an external igniter.

Further areas of applicability may become apparent from the detailed description provided hereinafter. It should be understood that the detailed description, while indicating the various embodiments of the invention, are intended for purposes of illustration only and are not intended to limit the scope of the disclosure of the appended claims.

BRIEF DESCRIPTION OF THE DRAWINGS

The present description may become more fully understood from the accompanying drawings, wherein:

FIG. 7a is a detailed, elevational view of the downstream side of the main injector plate according to a first embodiment of the present invention;

FIG. 7b is a detailed cross-sectional view of the main injector plate taken along line 7b in FIG. 7a;

FIG. 8a is a detailed elevational view of a downstream side of the main injector plate according to a second embodiment of the present invention;

FIG. 8b is a detailed cross-sectional view of the injector plate taken along line 8b in FIG. 8a;

DETAILED DESCRIPTION OF VARIOUS EMBODIMENTS

The following description of various embodiments is merely exemplary in nature and is in no way intended to limit the invention, its application, or uses. For example, although the following combustor and systems are described in conjunction with a terrestrial gas turbine, each and/or all may be used in other systems. Furthermore, the pre-mixer and heat exchanger may be used in systems other than turbine systems.

Figure 1:
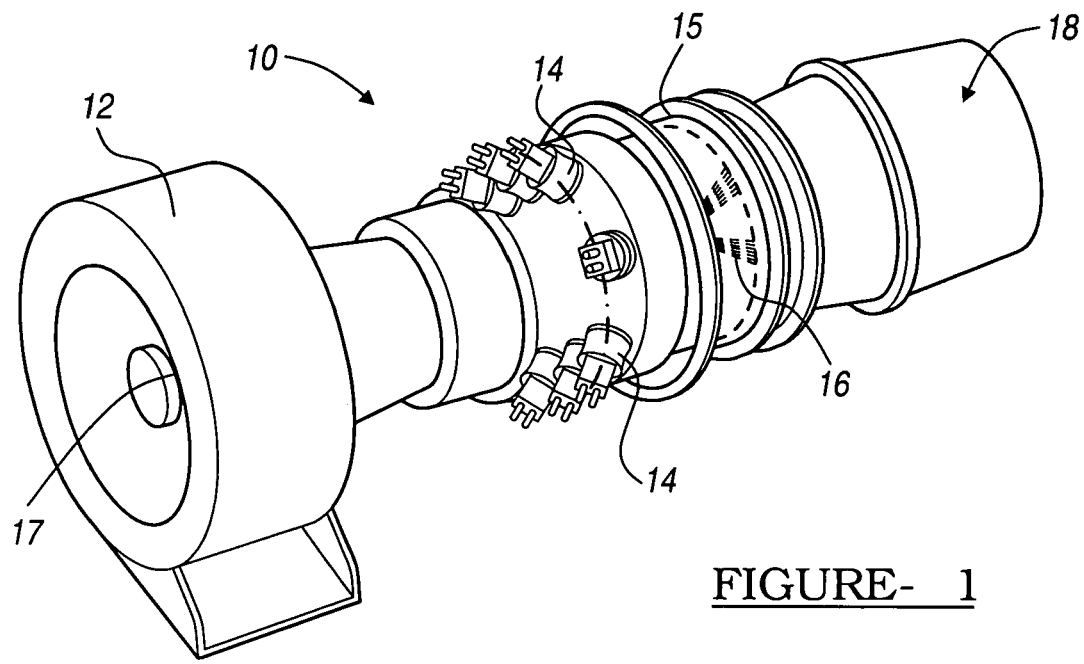
FIG. 1 is a perspective view of a gas powered turbine including a combustor in accordance with the present invention.

Referring to FIG. 1, a gas powered turbine in accordance with various embodiments of the present invention is shown. The gas powered combustion turbine 10 may use any appropriate fuel that may be combusted and may expand to move portions of the gas powered turbine 10 to produce power. The gas powered turbine 10 also may include a compressor 12 that forces atmospheric air into the gas powered turbine 10. Also, the gas powered turbine 10 includes several combustion chambers 14 for combusting the fuel. The combusted fuel is used to drive a turbine 15 including turbine blades or fans 16 which are axially displaced in the turbine 15. There are generally a plurality of turbine fans 16, however, the actual number depends upon various factors, such as the power the gas powered turbine 10 is to produce. Only a single turbine fan is illustrated for clarity.

In general, the gas powered turbine 10 ingests atmospheric air, combusts a fuel in it, which powers the turbine fans 16. Air may be pulled in and compressed with the compressor 12, which generally includes a plurality of concentric fans which grow progressively smaller along the axial length of the compressor 12. The fans in the compressor 12 may be powered by a single axle. The high pressure air then enters the combustion chambers 14 where the fuel is added and combusted. Once the fuel is combusted, it expands out of the combustion chamber 14 and engages the turbine fans 16 which, due to aerodynamic and hydrodynamic forces, spins the turbine fans 16. The gases form an annulus that spin the turbine fans 16, which are affixed to a shaft (not shown). Generally, there are at least two turbine fans 16. One or more of the turbine fans 16 engage the same shaft that the compressor 12 engages.

The gas powered turbine 10 may be self-powered since the spinning of the turbine fans 16 also powers the compressor 12 to compress air for introduction into the combustion chambers 14. Other turbine fans 16 are affixed to a second shaft 17 which extends from the gas powered turbine 10 to power an external device. After the gases have expanded through the turbine fans 16, they are expelled out through an exhaust port 18. It will be understood that the gas powered turbine 10 may be used for many different applications such as engines for vehicles and aircraft or for power production in a terrestrially based gas powered turbine 10.

The gases that are exhausted from the gas powered turbine 10 include many different chemical compounds that are created during the combustion of the atmospheric air in the combustion chambers 14. If only pure oxygen and pure hydrocarbon fuel, were combusted, absolutely completely and stoichiometrically, then the exhaust gases would include only carbon dioxide and water. Atmospheric air, however, is not 100% pure oxygen and includes many other compounds such as nitrogen and other trace compounds. Therefore, in the high energy environment of the combustion chambers 14, many different compounds may be produced. All of these compounds exit the exhaust port 18.

It is generally known in the art that an equivalence ratio is determined by dividing the actual ratio of fuel and air by a stoichiometric ratio of fuel to air (where there is not an excess of one starting material). Therefore, a completely efficient combustion of pure fuel and oxygen would equal an equivalence ratio of one. It will be understood that although atmospheric air in a hydrocarbon fuel may be preferred for economic reasons other oxidizers and fuels may be provided. The air may provide an oxidizer for the fuel.

It will be understood that the gas powered turbine 10 may include more than one combustion chamber 14. Any reference to only one combustion chamber 14, herein, is for clarity of the following discussion alone. The present invention may be used with any oxidizer or fuel which is used to power the gas powered turbine 10. Moreover, the combustor 14 may combine any appropriate fuel. Air is simply an exemplary oxidizer and hydrocarbons an exemplary fuel.

The fuel that may be combusted in the gas powered turbine 10 may be any appropriate fuel. The fuel may be liquid or gaseous depending upon various considerations and applications. In addition, the fuel may be any appropriate material that may be combusted in a selected oxidizer, such as the oxygen and atmospheric air. For example, the fuel may be a hydrocarbon fuel such as methane, kerosene, Synthesis, and other appropriate hydrocarbon fuels. In addition, the fuel may be hydrogen or other appropriate fuels. The hydrogen may be formed in any appropriate manner and provided to the gas powered turbine 10 to combust in the oxidizer to power the turbine fans 16.

Figure 2:
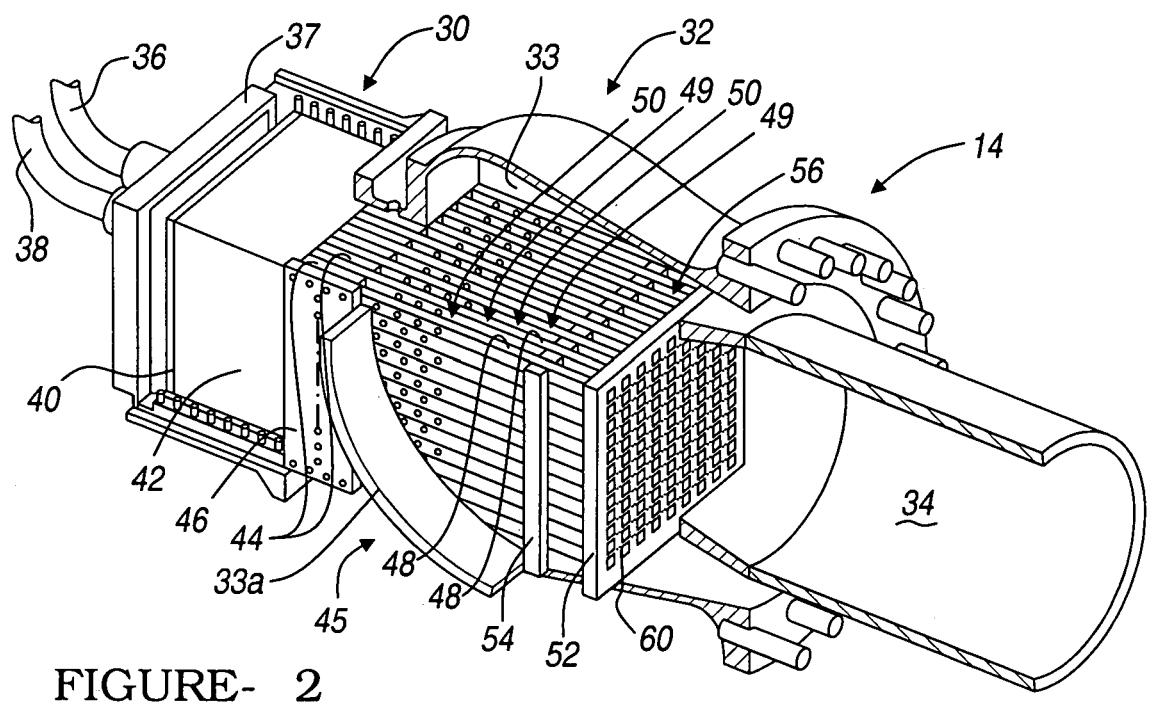
FIG. 2 is a partial cross-sectional perspective view of a single combustor.

With reference to FIG. 2, an exemplary combustion chamber 14 is illustrated. The combustion chamber may comprise any appropriate combustion chamber such as the one described in U.S. patent application Ser. No. 10/120,268 filed Apr. 10, 2002 entitled, "A Catalytic Combustor For Substantially Eliminating Nitrous Oxide Emissions," incorporated herein by reference. The combustion chamber 14 includes a premix section or area 30, a heat exchange or pre-heat section 32, generally enclosed in a heat exchange chamber 33, and a main combustion section 34. A first or premix fuel line 36 may provide fuel to the premix area 30 through a fuel manifold 37 and a second or main fuel line 38 may provide fuel to the main combustion section 34 through a main injector 52. Positioned in the premix area 30 is a premix injector 40 which injects fuel from the first fuel line 36 into a premix chamber or premixer 42. Air from the compressor 12 enters the premix area 30 through a plurality of cooling tubes 44 of a heat exchanger or pre-heater 45 (detailed in FIG. 3). The premix chamber 42 encompasses a volume between the premix injector 40 and the exit of the cooling tubes 44.

With further reference to FIG. 2, a plurality of catalytic heat exchange or catalyst tubes 48 extend into the heat exchange area 32. The heat exchange tubes 48 are spaced laterally apart. The heat exchange tubes 48, however, are not spaced vertically apart. This configuration creates a plurality of columns 49 formed by the heat exchange tubes 48. Each heat exchange tube 48, and the column 49 as a whole, define a heat exchanger or catalyst pathway for air to travel through. The columns 49 define a plurality of channels 50. It will be understood this is simply exemplary and the tubes may be spaced in any configuration to form the various pathways. Extending inwardly from the walls of the heat exchange chamber 33 may a directing fin 33a. The directing fin 33a may direct the flow of air to the top and the bottom of the heat exchange chamber 33 so that air is directed to flow vertically through the channels 50 defined by the heat exchange tubes 48. It will be understood by one skilled in the art that any appropriate number of the directing fin 33a and configuration may be used. It will also be understood that the fin 33a is not necessary and the air may be directed by hydraulic flow and the heat exchanger chamber 33.

Near the ends of the heat exchange tubes 48, where the heat exchange tubes 48 meet the main combustion section 34, is a main injector 52. The second fuel line 38 provides fuel to the main injector 52 so that fuel may be injected at the end of each heat exchange tube 48. Spaced away from the main injector 52, towards the premix area 30, is an intra-propellant plate 54. The intra-propellant plate 54 separates the air that is traveling through the channels 50 and the fuel that is being fed to the fuel manifold region 56 between the main injector face 52 and intra-propellant plate 54. It will be understood, that the intra-propellant plate 54 is effectively a solid plate, though not literally so in various embodiments and not illustrated here as a single solid plate. The placement of the heat exchange tubes 48 may dictate that the intra-propellant plate 54 be segmented wherein one portion of the intrapropellant plate 54 is placed in each channel 50 between two columns 49.

Air that exits the heat exchange tubes 48 is entrained with fuel injected from an injector port 60 (illustrated more clearly herein) in the main injector 52 and this fuel then combusts in the main combustion section 34. The main combustion section 34 directs the expanding gases of the combusted fuel to engage the turbine fans 16 so that the expanded gases may power the turbine fans 16.

Figure 3:
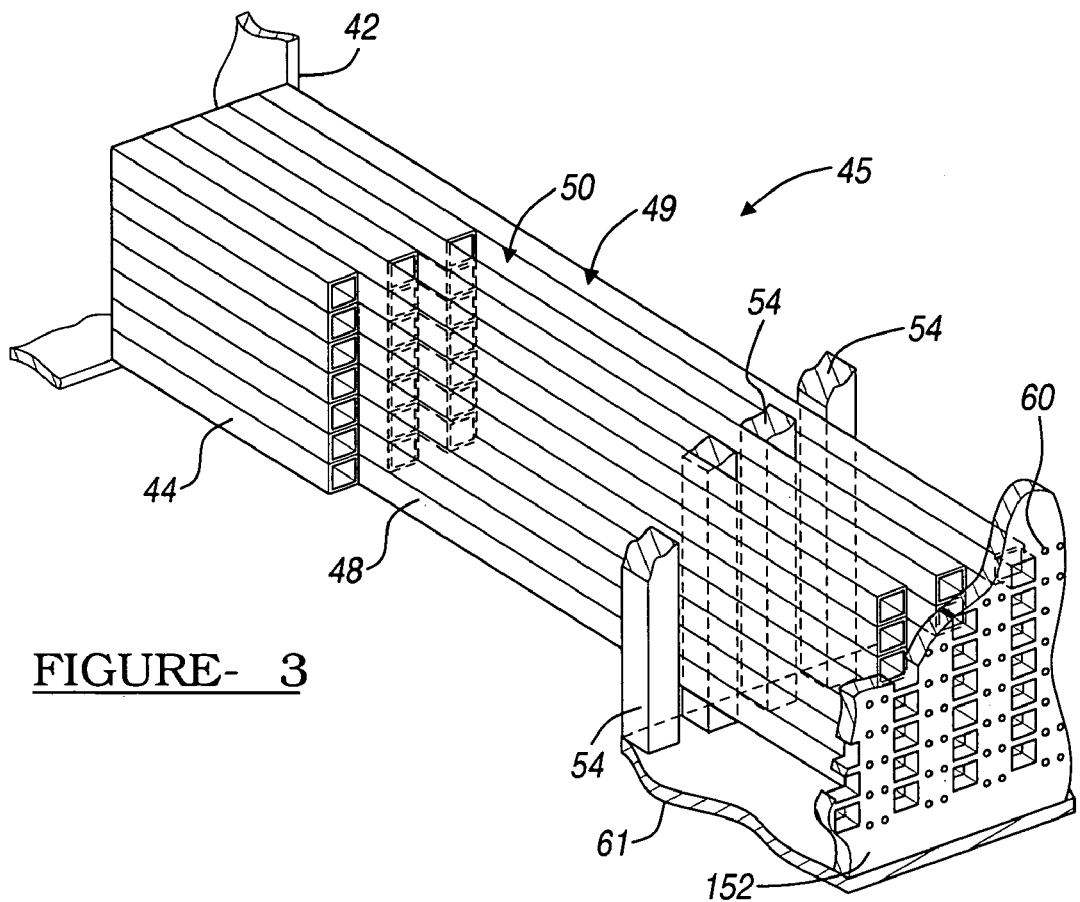
FIG. 3 is a detailed, partial cross-sectional, perspective view of a portion of the heat exchanger.

Turning reference to FIG. 3, a detailed portion of the heat exchanger 45 is illustrated. Although, in one embodiment, the heat exchanger 45 includes a large plurality of tubes, as generally shown in FIG. 2, only a few of the heat exchange tubes 48 and cooling tubes 44 are illustrated here for greater clarity. The heat exchanger 45 is similar to that described in U.S. Pat. No. 5,309,637 entitled "Method of Manufacturing A Micro-Passage Plate Fin Heat Exchanger", incorporated herein by reference. The heat exchanger 45 includes a plurality of cooling tubes 44 disposed parallel to and closely adjacent the heat exchange tubes 48. Each of the cooling tubes 44 and the heat exchange tubes 48 may have a generally rectangular cross section and can be made of any appropriate material such as one having a generally good thermally conductive material. The heat exchange tubes 48 and the cooling tubes 44 may be formed of stainless steel. It will be appreciated that while the cooling tubes 44 and the heat exchange tubes 48 are shown as being substantially square, the cross-sectional shape of the components could comprise a variety of shapes other than squares. Without being bound by the theory, it is believed that the generally square shape may provide a good thermal transfer between the tubes 44 and 48.

Both the cooling tubes 44 and the heat exchange tubes 48 may be of any appropriate size and may be generally square in cross-section having a width and height of about 0.04 inches to about 1.0 inches (between about 0.1 centimeters to about 2.5 centimeters). The thickness of the walls of the cooling tubes 44 and the heat exchange tubes 48 may be any appropriate thickness. The walls may be strong enough to allow the fluids to flow through them, but still allow for an efficient transfer of heat between the inside of the heat exchange tubes 48 and the air in the channels 50 and cooling tubes 44. The thickness may also vary according to various reasons such as size and material choice.

The cooling tubes 44 extend parallel to the heat exchange tubes 48 for a portion of the length of the heat exchange tubes 48. As discussed above, the heat exchange tubes 48 generally define a pathway that may be a catalyst or heat exchange pathway. The cooling tubes 44 also define a pathway that is generally a cooling pathway. The cooling tubes 44 may also define a portion of the heat exchange pathway as the oxidizer, such as the compressed atmospheric air, travels pass the heat exchange tubes 48 through the heat exchanger 45.

Generally, each of the cooling tubes 44 is brazed to one of the heat exchange tubes 48 for the distance that they are placed adjacent one another. Moreover, the cooling tubes 44 and the heat exchange tubes 48 may be brazed to an adjacent tube of the same type. The cooling tubes 44 extend between the columns 49 of the heat exchanger tubes 48. According to various embodiments, brazing materials are those with melting temperatures above about 538° C. (about 1000° F.). The cooling tubes 44 extend between the columns 49 of the heat exchanger tubes 48. The cooling tubes 44 and the heat exchange tubes 48, that may be brazed together, form the heat exchanger 45 that can provide a surface-to-surface exchange of heat. It will be understood, however, that air traveling in the channels 50 between the heat exchange tubes 48 may also become heated due to the heat transferred from the heat exchange tubes 48 to the air in the channels 50.

Referring further to FIG. 3, fuel injector ports 60 are formed in the main injector 52. The injector ports 60 may be provided in any appropriate number. According to various embodiments, there is a ratio of heat exchange tubes 48 to injectors 60 of at least four to one. It will be understood, however, that any appropriate ratio of the injectors 60 to the heat exchange tubes 48 may be provided. The fuel is provided to the manifold region 56 which is bound by the intra-propellant plate 54, the main injector plate 52, and a manifold plate 61. The manifold plate 61 may underlay, overlay, or surround the manifold region 56. This provides fuel to each of the injector ports 60 without requiring an individual fuel line to each injector port 60. Therefore, as air exits each heat exchange tube 48, fuel is injected from the injector port 60 to the stream of air emitted from each heat exchange tube 48. In this way, the fuel can be very efficiently and quickly distributed throughout the air flowing from the heat exchanger 45, as discussed further herein.

On the interior walls of each heat exchange tube 48 is disposed a coating of a catalyst. The catalyst may be any appropriate catalyst that is able to combust a hydrocarbon fuel, and may include, for example, platinum, palladium, or mixtures thereof. The catalyst is able to combust a hydrocarbon fuel, such as methane, without the presence of a flame or any other ignition source. The catalyst is also able to combust the fuel without generally involving any side reactions. Therefore, the combustion of fuel does not produce undesired products. It will be understood that if the fuel is not a hydrocarbon then the appropriate catalyst may be different or the same. The catalyst allows combustion of the fuel without an additional heat source.

Figure 4:
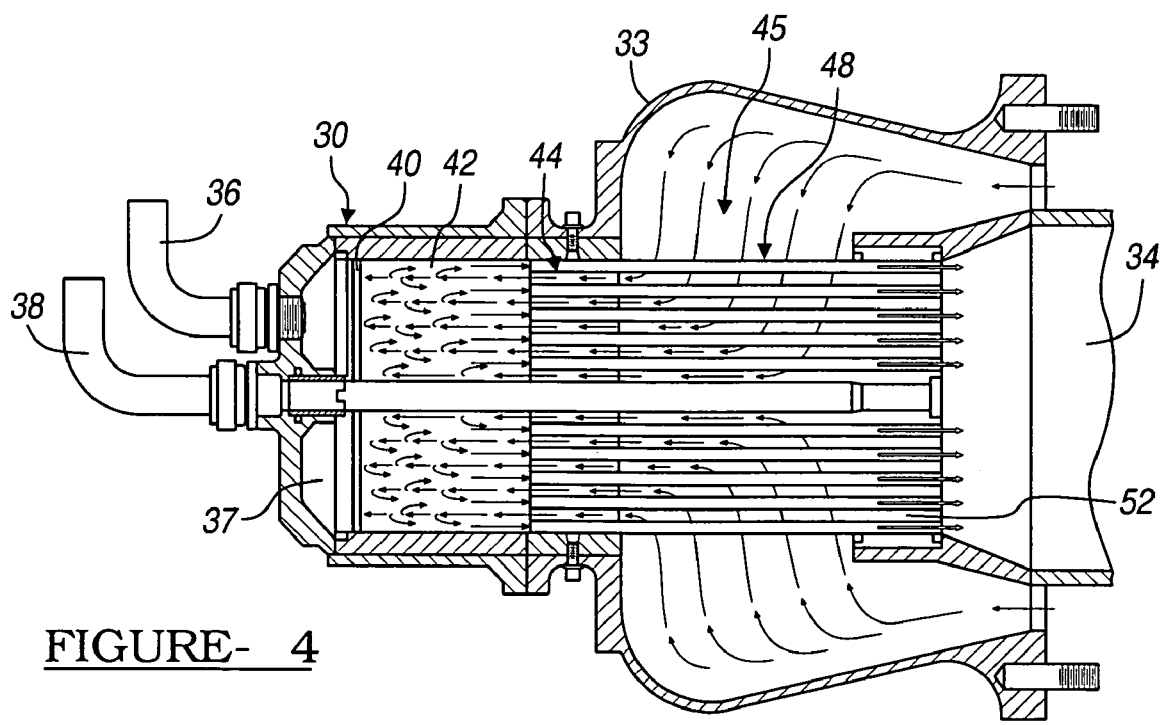
FIG. 4 is a simplified diagrammatic view of the flow of air through the combustion chamber according to a first embodiment of the present invention.
Figure 5:
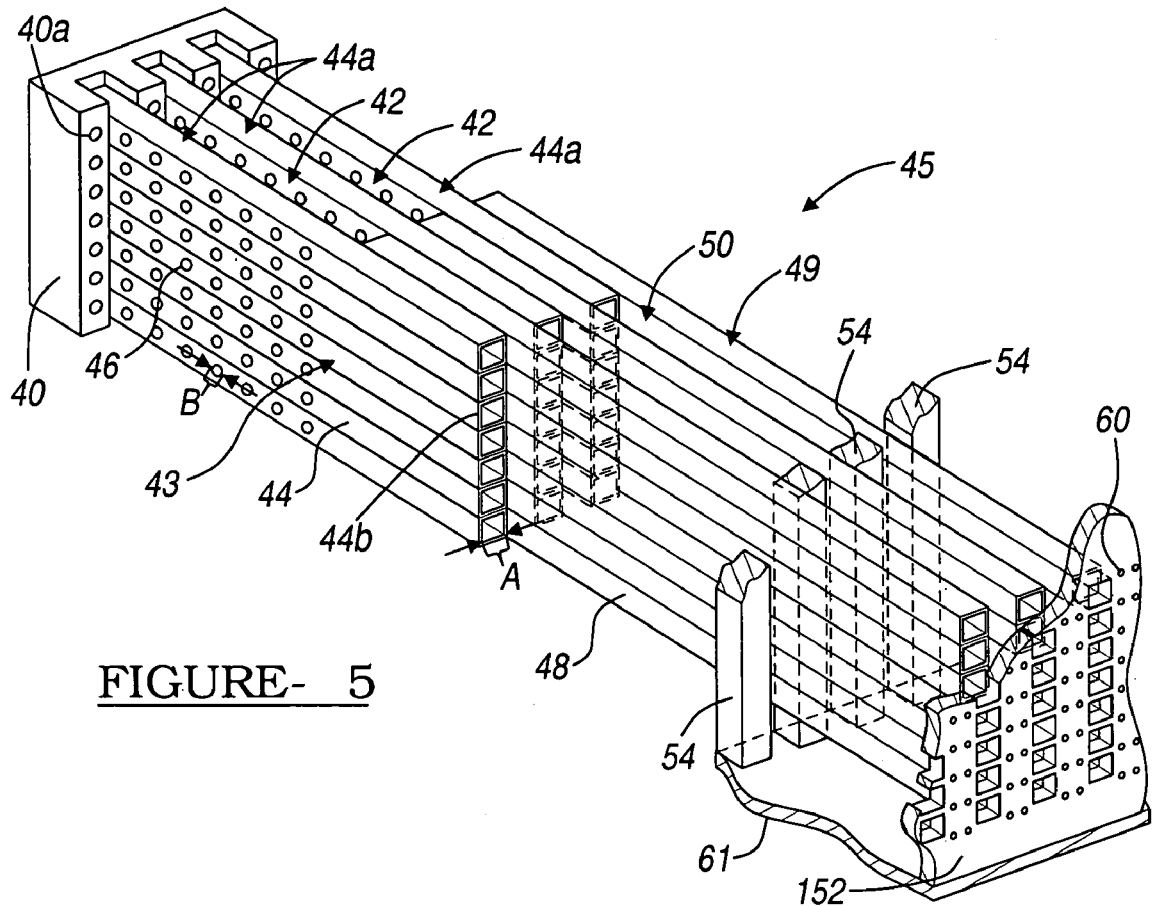
FIG. 5 is a detailed, partial cross-sectional, perspective view of a portion of the heat exchanger according to a second embodiment.

With continuing reference to FIGS. 1–3 and further reference to FIG. 4, a method of using the combustion chamber 14 according to various embodiments will be described. The combustor 14 includes a pre-mixer 42 which may be formed in any appropriate manner. The pre-mixer 42 may include an open region, as illustrated in FIG. 4, or may include a plurality of the cooling tubes 44, as illustrated in FIG. 5, and described further herein. When an open region is used as the pre-mixer 42 the flow generally follows the path indicated by the arrows in FIG. 4. It will also be understood that a plurality of tubes, as described above, are present in the heat exchanger, but have been removed for clarity in the present description of the air flow. Atmospheric air is compressed in the compressor 12 and then introduced into the heat exchange chamber 33 at a high pressure. The air that enters the heat exchange chamber 33 is directed by the directing fins 33a to the top and bottom of the heat exchange chamber 33 so that the air may flow through the channels 50. The air that enters the heat exchange chamber 33 may be at a temperature of about 37° C. to about 427° C. (about 100° F. and about 800° F.). Generally, however, the air enters the heat exchanger 45 at a temperature of about 204° C. to about 400° C. (about 400° F. to about 750° F.).

As the air travels in the channels 50, the air increases in temperature to become "hot" air. The hot air flows through the pathway formed by the cooling tubes 44, which may also be referred to as a cooling tube pathway, and into the premix area 30. The hot air also receives thermal energy while flowing through the cooling tubes 44. It will be understood that the cooling tubes 44 are adjacent a portion of the heat exchange tubes 48. The temperature of the hot air, as it enters the premix area 30, may be about 427° C. to about 538° C. (about 800° F. and about 1000° F.). The air in the premix area 30 makes a turn within the premix chamber 42. As the air turns inside the premix chamber 42, the premix injector 40 injects fuel into the air, entraining the fuel in the air. About 30% to about 60% of all the fuel used to power the gas powered turbine 10 is entrained in this manner in the premix chamber 42.

After the air enters the premix chamber 42, it may flow out through the pathway formed by the heat exchange tubes 48. In the heat exchange tubes 48, the fuel in the air combusts as it engages or reacts with the catalyst which is disposed on the inside walls of the heat exchange tubes 48. The catalyst may be disposed within the heat exchange tube 48 in a plurality of ways such as coating by painting or dipping or by affixing seals to the internal walls. As the fuel combusts, the temperature of the air may rise to about 768° C. to about 930° C. (about 1400° F. to about 1700° F.). As the temperature of the air rises, it becomes highly energetic to form high energy air and may then exit the heat exchange tubes 48. The temperature that the high energy air reaches in the heat exchange tubes 48 is at least the hypergolic or auto-ignition temperature of the fuel being used in the gas powered turbine 10. Therefore, the high energy air that exits the heat exchange tubes 48 is, and may also be referred to as, hypergolic or auto ignition air. The auto-ignition temperature of the air is the temperature that the air may be at or above so that when more of the fuel is injected into the hypergolic air the fuel ignites automatically without any other catalyst or ignition source.

With reference to FIG. 5, a portion of the premix chamber 42, according to various embodiments, is illustrated in greater detail. Here it may be more easily seen that a plurality of the cooling tubes 44 are stacked vertically to form a cooling tube column 44a. Each cooling tube 44 and the plurality of cooling tube columns 44a define a cooling pathway. Therefore, air can enter the combustion chamber 14, travel through the channels 50, adjacent the heat exchange tubes 48, and through the cooling pathway defined by each of the cooling tubes 44. The cooling tubes 44, therefore, include an inlet 44b. The inlet 44b is where the air enters the cooling tube 44 from the heat exchange channel 50. The cooling tube inlet 44b defines an inlet area A through which air may travel. The cooling tube inlet 44b may allow the air to enter the cooling tube 44 as it travels to the premix chamber 42. In the premixer 42 each of the cooling tubes 44 defines a plurality of exit orifices or ports 46. Each of the exit orifices 46 include an exit area B. The air traveling through the cooling tubes 44 can exit the exit orifices 46 to enter the premix areas 42. Each exit orifice area B is generally smaller than the inlet area A, however, the total area of all of the exit orifice areas B may be equal to or greater than the inlet area A. Moreover, each of the cooling tubes 44 preferably includes a plurality of the exit orifices 46. Therefore, the total exit orifice area B for each cooling tube 44 may be greater than the inlet area A. The specific ratio may depend upon the operating conditions, such as temperature or fuel type, for the combustor 14.

Figure 5A:
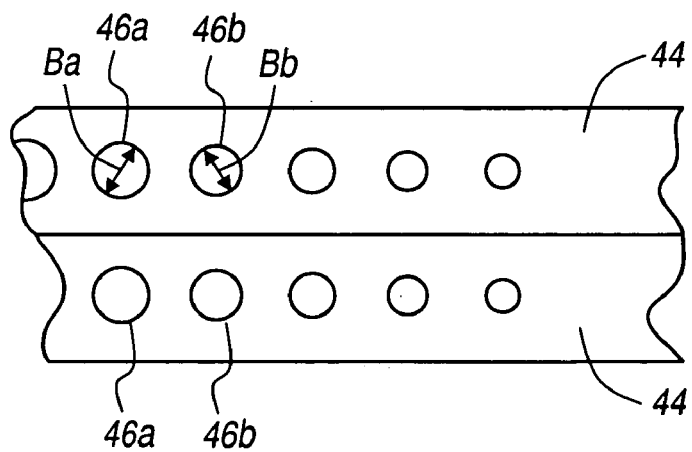
FIG. 5a is a detailed view of a portion of the pre-mixer according to the second embodiment.
Figure 5B:
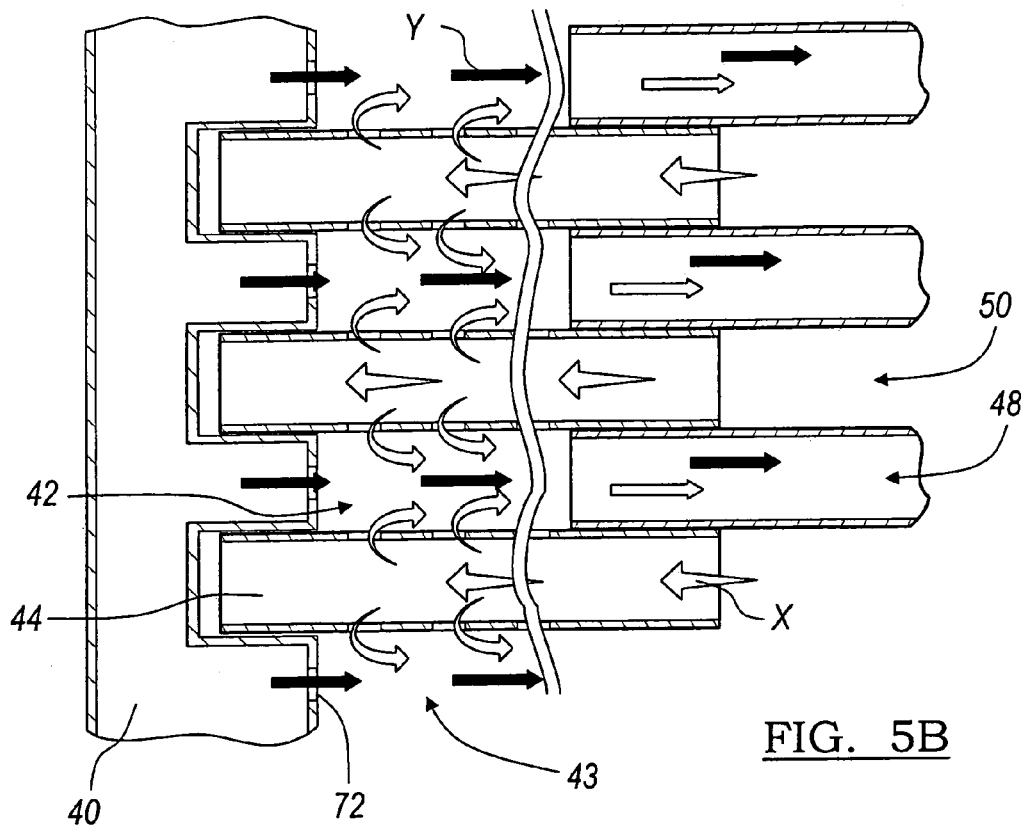
FIG. 5b is a simplified diagrammatic view of a theoretical airflow in the combustor according to the second embodiment.

With continuing reference to FIG. 5 and further reference to FIG. 5A, each of the exit orifices 46 may have a different exit diameter B. Therefore, a first exit orifice 46a may have a first exit orifice area Ba while a second exit orifice 46b has a second orifice area Bb. The exit orifice areas B may be altered to alter the equivalence ratio of the air to the fuel and may also be used to directly control the flow of the oxidizer from the cooling tubes 44 out of the exit orifices 46. The exit orifices 46 may also be dynamic such that they may be altered during operation either manually or automatically.

The premix injector 40 includes a plurality of premix fuel injectors or orifices 40a. Once the air exits the exit orifices 46 into the premix chamber 42, fuel is injected through the premix injector ports 40a to mix with the air that exits the cooling tubes 44. The number of premix injector ports 40a may depend upon the particular application and the fuel chosen to be combusted. Nevertheless, the ratio of the premix injector port 40a to cooling tubes 44 may be about 0.25 and about 3. After the air enters the premix chamber 42, it then flows out of the premix chamber 42 through the pathway formed by the heat exchange tubes 48.

Positioned or disposed in the pre-mixer 42, according to various embodiments may be a combustion or flashback inhibitor or suppressor. The flashback suppressor may be provided to limit or eliminate combustion of the fuel in the pre-mixer 42 before the fuel reaches the catalyst tubes 48 or flash back into the pre-mixer 42 from the catalyst tubes 48. Appropriate suppressors includes coatings to eliminate pre-oxyl radicals from forming or a physical structure that is at least the quenching distance for the fuel being injected into the pre-mixer 42. Other appropriate methods may also be used to inhibit combustion or flashback of the fuel before it reaches the catalyst tubes 48.

Additional fuel is injected through the main injector 52 as the air exits the heat exchange tubes 48 and enters the main combustion section 34. The fuel injected from the main injector 52 is injected through the individual injector ports 60. Any ratio of injector ports 60 to heat exchange tubes 48 may be used as long as all of the air exiting the heat exchanger 45 is thoroughly mixed with fuel. Any additional fuel to power the gas powered turbine 10 is injected at this point, such that fuel is added to the air at the premix chamber 42 and from the injector ports 60.

As the air travels through the heat exchange tubes 48, the fuel that was entrained in the air in the premix chamber 42 may be at least partially combusted by the catalyst. This raises the temperature of the air from the temperature that it enters the heat exchange chamber 33. In particular, the temperature of the air may be raised to about 700° C. to about 880° C. (about 1300° F. to about 1600° F.). This temperature is generally the hypergolic temperature of the fuel so that the fuel combusts spontaneously when added through the injector port 60. It will be understood that different fuels have different hypergolic temperatures. Therefore, the amount of fuel added in the premix section 42 may be altered to determine the temperature of the air exiting the heat exchange tubes 48.

Figure 6:
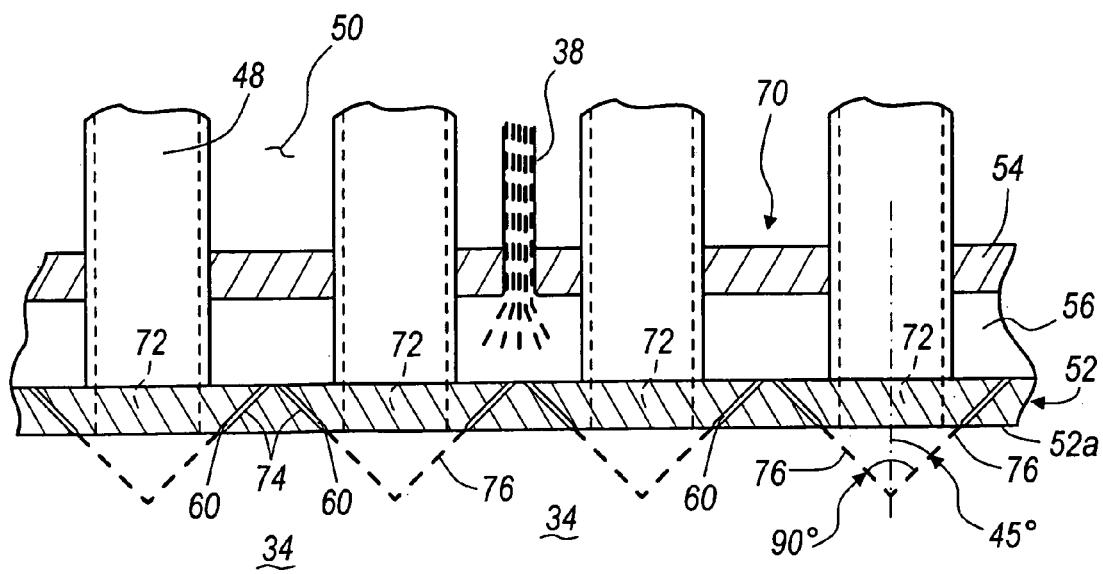
FIG. 6 is a detailed, cross-sectional view of a portion of the main injectors.

With reference to FIG. 6, the heat exchange tubes 48 extend from an upstream side 70 through the intra-propellant plate 54 and terminate into the main injector 52. A face of the injector 52a is downstream of the heat exchange tubes 48. Fuel may be provided through the main fuel line 38 to the manifold region 56 which is the area between the intra-propellant plate 54 and the main injector 52. Although only one main fuel line 38 is illustrated, it will be understood that more than one main fuel line may be provided. Formed in the main injector plate 52 are oxidizer passages or pathways 72 which are extensions of the heat exchange tubes 48 formed in the main injector plate 52. The hypergolic air from the heat exchange tubes 48 passes through the oxidizer pathways 72 and exits into the main combustion area 34.

Extending back from the injector port 60 is a fuel injection path 74. Each fuel injector port 60 may include at least one fuel pathway 74. The fuel pathway 74 may be a bore formed in the main injector plate 52 to allow access between the fuel manifold region 56 so that the fuel which is provided to the fuel manifold region 56 from the main fuel line 38 can reach the combustion area 34. Generally, the fuel pathways 74 may be formed in the main injector plate 52 and the spaces or lands between the oxidizer pathways 72 which extend from the heat exchange tubes 48.

The fuel exits the injector ports 60 as a fuel stream 76 in line with the fuel pathway 74 provided in the main injector plate 52. Preferably, the fuel stream 76 has a half angle of about 40° to about 50° and preferably of about 450. Therefore as two of the fuel streams 76 intersect, in an area of the combustion chamber 34, which is downstream of the face 52a of the injector plate 52, the streams intersect at about an 80° to 100° angle. It will be understood, however, that the fuel streams 76 may intersect at any appropriate angle. For example, the fuel streams may intersect at angles ranging of about 20° to about 150°.

With reference to FIGS. 7A and 7B, a first embodiment of the fuel injector port 60 is illustrated. The hypergolic air, which acts as an oxidizer, exits from the oxidizer pathways 72. As this is happening, fuel exits from the injector ports 60 and is transmitted along fuel streams 76. Because the two fuel streams 76 are angled, they intersect at a point downstream of the oxidizer pathways 72 and between the oxidizer pathways 72 in a land region 77. As discussed above, two fuel streams 76 may intersect at an angle of about 90°. When this intersection occurs, the two fuel streams interrupt or intersect each other and produce a fuel plume 80 which spreads into the appropriate oxidizer pathways 72. The fuel plume 80 may be a substantially and finely atomized from the fuel streams 76 that are spreading out extremely rapidly. This allows the fuel in the fuel streams 76 to intermix very quickly with the hypergolic air as it exits the oxidizer pathways 72.

As discussed above, the air exits the oxidizer pathways 72 at approximately the auto-ignition or hypergolic temperature of the fuel in the fuel streams 76. Therefore, as soon as the fuel from the fuel streams 76 is raised to the temperature of the hypergolic air exiting the oxidizer pathways 72, the fuel ignites. Therefore, when the fuel mixes substantially completely with the air, as it exits the oxidizer pathways 72, the entire amount of fuel injected with the fuel streams 76 ignites at substantially the same time. As this occurs, the ignition of fuel from the fuel streams 76 across the face 52a of the injector plate 52 is substantially constant and equal. Therefore, there are substantially no hot spots created, thus keeping the temperature of the combustion chamber 34 to one which allows substantially no nitrous oxide compounds to be produced.

Because the fuel in the fuel plume 80 is spreading out so quickly into the high energy air exiting the oxidizer pathways 72, the fuel mixes with the hypergolic air and becomes heated to the hypergolic temperature faster than the ignition or combustion rate of the fuel. Therefore, substantially all of the fuel that is injected from the injector port 60 reaches the hypergolic temperature at the same time. Therefore, substantially all the fuel combusts at substantially the same time, which substantially reduces the creation of discrete hot spots.

With references to FIGS. 8A and 8B, a fuel injector port 90 according to various embodiments of the present invention is illustrated. In the various embodiments, high energy air exits the main injector 52 through the oxidizer pathways 72. Fuel streams 76 are also produced as fuel exits a plurality of injector ports 90. The injector ports 90 are not circular, but rather are generally rectangle in shape having a height of H which substantially greater than a width W. The height H of the injector port 90 extends substantially parallel to the height of the oxidizer pathways 72. Therefore, a fuel stream or fan 92 is produced by the fuel injectors 90 that is substantially spread out or flattened, as it exits the injector port 90, as opposed to the fuel stream 76 described previously.

Fuel may enter the fuel pathway 74 through any appropriately shaped port, but as the pathway 74 nears the injector port 90, the pathway becomes substantially rectangular having a height H which is much greater than a width W. With particular reference to FIG. 8B, the upstream side of the main injector plate 52 includes an inlet port 94, that is substantially circular in shape. Nevertheless, the injector port 90 is substantially rectangular in shape. The fuel stream 92 produces is already substantially spread out or thinned before it reaches an intersection point with another fuel stream 92. As two fuel streams 92 intersect, they produce a fuel plume 96 which allows the fuel provided through the injector ports 90 to be mixed with the hypergolic air exiting the oxidizer pathways 72 before the fuel, provided in the fuel streams 92, reaches its ignition temperature.

This may also allow a substantial intermixing of the fuel with the air exiting the oxidizer pathways 72 before the fuel combusts so that the combustion in the combustion chamber 34, across the face of 52a of the main injector plate 52 is substantially even. This generally does not allow hot spots in the combustion area 34 to form, thereby substantially eliminating the production of NOX chemicals. It will be appreciated that opposing fuel fans 92 are not necessary to provide an appropriate fuel plume 96. Because the injector port 90 produces a fuel fan 92 that is already substantially spread out and dispersed, the impingement of two fuel streams may not be necessary.

As discussed above, the air that exits the heat exchanger 45 is at the auto-ignition or hypergolic temperature of the fuel used in the gas powered turbine 10. Therefore, as soon as the fuel reaches the temperature of the air, the fuel ignites. Since the fuel may be thoroughly mixed with the air, the combustion of the fuel is nearly instantaneous and may not produce any localized or discrete hot spots. Because the fuel may be well mixed with the air exiting the heat exchanger 45, there is no one point or area which has more fuel than any other point, which could also create hot spots in the main combustion section 34. Therefore, the temperature of the air coming from the main injector 52 and into the main combustion section 34 is substantially uniform. During operation of the gas powered turbine 10, the fuel's characteristic mixing rate is shorter than the combustion rate of the fuel.

The temperature of the air, after the additional fuel has been combusted from the main injector 52, may be about 1315° C. to about 1595° C. (about 2400° F. and about 2800° F.). Preferably, the temperature, however, is not more than about 1426° C. (about 2600° F.). Different fuel to air ratios may be used to control the temperature in the main combustion section 34. The main combustion section 34 directs the expanding gases into a transition tube (shown in part extending from the combustion section 34) SO that it engages the turbine fans 16 in the turbine area 15 at an appropriate cross sectional flow shape.

The use of the heat exchanger 45 raises the temperature of the air to create hot or heated air. The hot air allows the catalyst to combust the fuel that has been entrained in the air in the premix chamber 42 without the need for any other ignition sources. The catalyst only interacts with the hydrocarbon fuel and the oxygen in the air to combust the fuel without reacting or creating other chemical species. Therefore, the products of the combustion in the heat exchange tubes 48 are substantially only carbon dioxide and water due to the catalyst placed therein. No significant amounts of other chemical species are produced because of the use of the catalyst. Also, the use of the heat exchange tubes 48, with a catalyst disposed therein, allows the temperature of the air to reach the auto-ignition temperature of the fuel so that no additional ignition sources are necessary in the main combustion section 34. Therefore, the temperature of the air does not reach a temperature where extraneous species may be easily produced, such as NOX chemicals. Due to this, the emissions of the gas powered turbine 10 of the present invention has virtually no NOX emissions. That is, that the NOX emissions of the gas powered turbine 10 according to the present invention are generally below about 1 part per million volume dry gas.

Also, the use of the heat exchanger 45 eliminates the need for any other pre-burners to be used in the gas powered turbine 10. The heat exchanger 45 provides the thermal energy to the air so that the catalyst bed is at the proper temperature. Because of this, there are no other areas where extraneous or undesired chemical species may be produced. Additionally, the equivalence ratio of the premix area is generally between about 0.20 and 0.30, while the equivalence ratio of the main injector 52 is between about 0.50 and about 0.60. This means that the fuel combustion will occur as a lean mixture in both areas. Therefore, there is never an excessive amount of fuel that is not combusted. Also, the lean mixture helps to lower temperatures of the air to more easily control side reactions. It will be understood that different fuel ratios may be used to produce different temperatures. This may be necessary for different fuels.

The catalyst positioned in the catalyst tubes 48 may be able to combust a selected fuel at a selected temperature. At least, it will be understood that the catalytic activity of the catalyst may reach an optimum or first order of reaction at a selected temperature, but may include a less optimum reaction at a different temperature. For example, and not intended to be limiting, if the fuel is natural gas to power the gas powered turbine 10, the catalytic activity for various selected catalyst may be substantially below optimum or desired catalytic activities at the temperature of the air that enters the catalytic tubes 48 during start-up. That is during start-up, the temperature of the air reaching the catalytic tubes 48, as discussed above, is generally about 37° C. and generally not greater than about 200° C. (98° F. to 390° F.).

The oxidizer that is generally used to oxidize the fuel, so that the fuel combusts, is atmospheric air that is drawn in through the compressor 12 into the gas powered turbine 10. The air may not be heated and is substantially near room temperature or ambient temperature when the air is drawn in to be a compressed with a compressor 12. Although the action of being drawn in and compressed with a compressor 12 may increase the temperature of the air, it still may not reach the optimal temperature for reacting the fuel with the catalyst. Therefore, it may be selected to provide a start-up heating apparatus near the catalytic tubes 48. For example, electric coils or induction coils may be positioned around or near the catalytic tubes 48 to heat the catalytic tubes 48 to a selected temperature. In addition, the air that is compressed with the compressor 12 may be heated to a selected temperature to react with the catalyst in the catalytic tubes 48.

Alternatively, or in addition to heating the air before it enters the catalytic tubes 48, particularly at start-up, a fuel that may have a higher kinetic energy on the catalyst on the catalytic tubes 48 may be used at start-up to achieve a selected temperature of the catalytic tubes 48. For example, hydrogen gas may be used during start-up to power the gas power turbine 10. As discussed above, hydrogen may be the fuel that is selected to combust in the oxidizer. In addition, two fuels may be used during a single operating procedure to achieve a selected operating condition. For example, hydrogen alone may be used to initially heat the catalytic tubes 48 and achieve a selected operating temperature and then a mixture of hydrogen and other selected fuels such as methane may be used for continuous operation or as an intermediary to a pure hydrocarbon or other selected fuel.

Nevertheless, using the gaseous hydrogen as the start-up fuel increases the kinetic activity thereby decreasing the temperature that the catalytic tubes 48 must be at to achieve an optimum reaction of the fuel with the oxidizer. Because the hydrogen may be able to react at a lower temperature, yet optimally, with the catalyst in the catalytic tubes 48, the reaction may be able to heat the catalytic tubes 48 to a selected temperature that may be an optimal reaction temperature of a second fuel in the gas powered turbine 10. Therefore, a different fuel may be used during a start-up phase than a fuel used during a continuous operation or later phase. During the start-up phase, the catalytic tubes 48 are heated to a selected temperature to allow for the optimal operating conditions of the gas powered turbine 10.

The use of two fuels may be used with substantially little difficulty in a single system. For example, and not intended to limit the description, a selected fuel may be natural gas, which may be used as a general and operating fuel, while hydrogen gas may be used as a start-up fuel. During the start-up phase, the gaseous hydrogen may react with the other portions of the gas powered turbine 10 in a substantially similar manner as the natural gas. For example, the hydrogen may be able to mix with the hypergolic air by being injected through the main injector plate 52 in a manner such that the gaseous hydrogen does not produce results that are dissimilar to other selected fuels. For example, a fuels injection momentum, $G_f$ (ft.-lbm/sec$_2$), at a given heating rate, is defined by the following equation:

$$G_f \propto \frac{\hat{M}_f}{P \Delta H_{c,f}^2} \quad (1)$$

where P is the main combustor compressor pressure (psi), $\hat{M}_f$ is the molecular weight of the fuel (grams/mol) and $\Delta H_{c,f}$ is the fuel's molar or volumetric heat of combustion (BTU/SCF).

The molecular weight and volumetric heating value of natural gas is approximately 16 g/mol and 920 BTU/SCF, respectively. For hydrogen, the molecular weight and volumetric heating value is about 2 g/mol and 300 BTU/SCF, respectively. Using Equation 1, at any given combustor pressure, the fuel momentum is substantially equivalent for the same excess air combustor firing rate. Therefore, the impingement jet mixture geometry may allow for proper mixing for either the natural gas or the hydrogen, so that they may be easily interchanged such that either fuel may be used to achieve substantially the same results in the gas powered turbine 10.

Selected fuels may be substantially mixed with the heated oxidizer before the fuel combusts using the various injectors, such as the impingement injector 60 and the fan forming injector 90. That is, that fuels that have substantially equivalent fuel injection momentums, as defined by Equation 1, may be used in similar injectors without changing the injector geometry. Therefore, according to the example described above where natural gas and hydrogen has substantially similar injector momentums, the injector will mix the fuel in a substantially similar manner.

It will be understood, however, that not all combinations of fuels or possibilities may include substantially similar injector momentums. The injector momentum may be easily determined, with Equation 1 or similar calculations or experiments, and if the injector momentum is substantially similar between two fuels or a plurality of fuels, then the injector may not need to be changed or altered to achieve similar or selected mixing. This allows that the combustor 14 may be operated using a plurality of types of fuels without changing any of the physical attributes, such as the injectors, of the combustor 14. This would allow a turbine 10 to remain in operation regardless of the fuel supply being used or available to operate the combustor 14.

Thus, it will be understood that hydrogen need not simply be a start up fuel, and may be a fuel used to operate the combustor 14 during operation. That is a methane fuel source may be available at a certain point in the operating cycle of the combustor and/or a hydrogen fuel source is available during a different operating cycle of the combustor 14. Either of the fuels could be used to operate the combustor 14 without changing any of the portions of the combustor 14. Simply, a different fuels may be run through the combustor 14.

Figure 9:
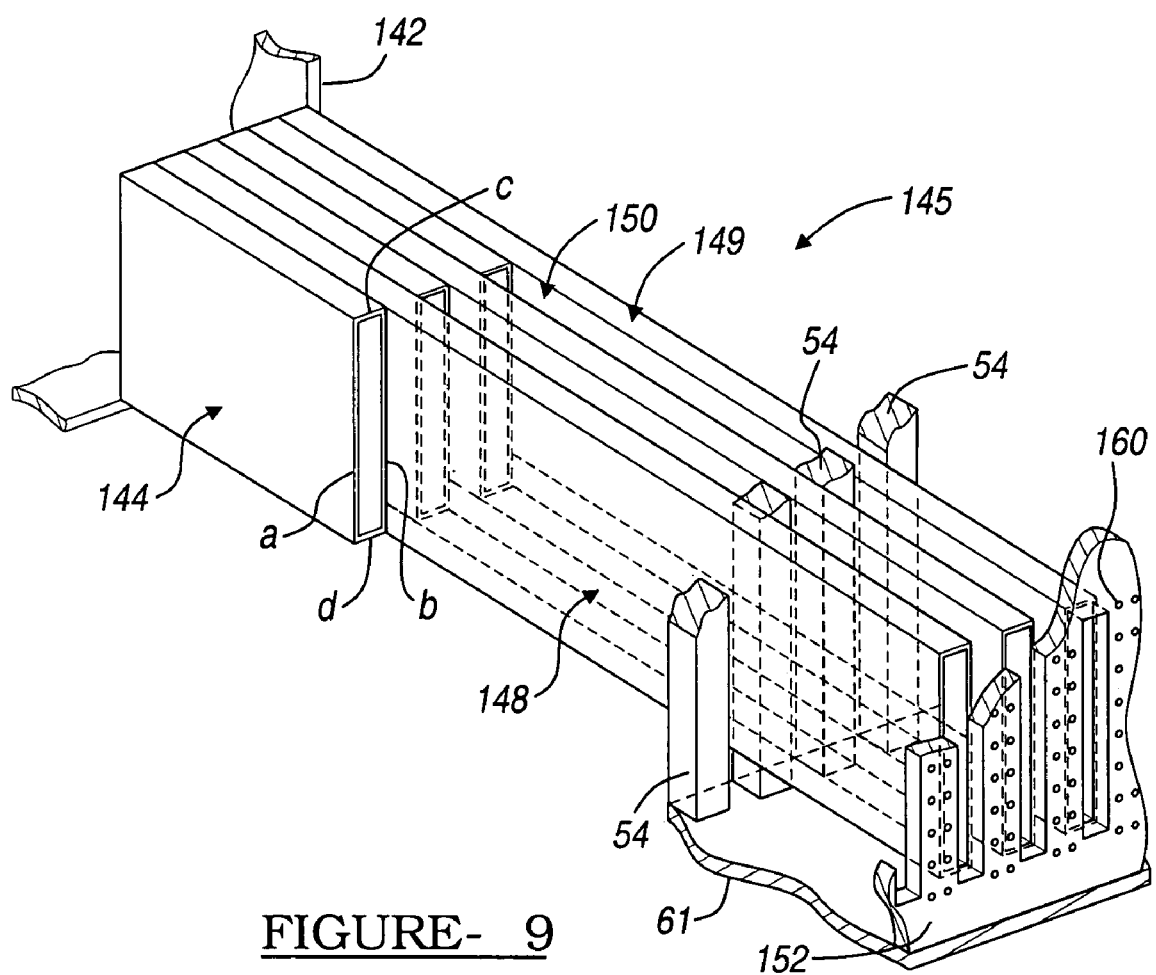
FIG. 9 is a detailed, partial cross-sectional, perspective view of a portion of the heat exchanger according to a second embodiment.

With reference to FIG. 9, a detail portion of the combustor 14, similar to the portion illustrated in FIG. 3, according to various embodiments of a heat exchanger 145 is illustrated. A premix chamber 142 allows air from the compressor to be mixed with a first portion of fuel. Air comes from the compressor and travels through a cooling fin or channel rather than through a plurality of cooling tubes 44, as discussed above in relation to the first embodiment. It will be understood that a channel can be defined by a fin, a wall, a member, or any appropriate structure. The figure only exemplary illustrates a passage that can be defined by a channel or fin.

With reference to FIG. 9, a detail portion of the combustor 14, similar to the portion illustrated in FIG. 3, according to various embodiments of a heat exchanger 145 is illustrated. A premix chamber 142 allows air from the compressor to be mixed with a first portion of fuel. Air comes from the compressor and travels through a cooling fin or channel rather than through a plurality of cooling tubes 44, as discussed above in relation to the first embodiment. It will be understood that a channel can be defined by a fin, a wall, a member, or any appropriate structure. The figure only exemplary illustrates a passage that can be defined by a channel or fin.

It will be understood that exit ports may also be formed in the cooling channels 144 to form the premix area 142. The cooling channel 144 is defined by two substantially parallel plates 144*a* and 144*b*. It will be understood, however, that other portions, such as a top and a bottom will be included to enclose the cooling channel 144. Additionally, a heat exchange or catalyst member, such as a catalyst channel 148, is provided rather than heat exchange tubes 48, as discussed above in the first embodiment. Again, the catalyst channel 148 is defined by side, top, and bottom walls and defines a column 149. Each catalyst column 149, however, is defined by a single catalyst channel 148 rather than a plurality of catalyst tubes 48, as discussed above. The cooling channel 144 may include a plurality of cooling channels 144. Each cooling channel 144, in the plurality, defines a cooling pathway. Similarly, the heat exchange channel 148 may include a plurality of heat exchange channels 148. Each, or the plurality of, the heat exchange channels 148 defines a heat exchange or catalyst pathway.

Additional channels 150 are still provided between each of the catalyst channels 148 so that air may flow from the compressor through the cooling channels 144 into the pre-mix chamber 142. Air is then premixed with a first portion of fuel and flows back through the catalyst channels 148 to the main injector plate 152. Injection ports 160 are provided on the main injector plate 152 to inject fuel as the air exits the catalyst channel 148. A suitable number of injection ports 160 are provided so that the appropriate amount of fuel is mixed with the air as it exits the catalyst channels 148. An intra-propellant plate 54 is also provided.

Injector ports 60 or 90 are still provided on the main injector plate 152 to provide fuel streams 76 or 92 as heated air exits the oxidizer paths (not particularly shown) from the catalyst channels 148. Either of the previously described injector ports 60 or 90 may be used with the second embodiment of the heat exchanger 145 to provide a substantial mixing of the fuel with the air as it exits the catalyst channels 148. This still allows a substantial mixture of the fuel with the air as it exits the catalyst channels 148 before the fuel is able to reach its ignition temperature. Therefore, the temperatures across the face of the main injector 152 and in the combustion chamber 34 are still substantially constant without any hot spots where NOX chemicals might be produced.

It will also be understood that the cooling channels 144 may extend into the pre-mixer 142 similar to the cooling tubes 44. In addition, ports may be formed in the portion of the cooling channels 144 extending into the pre-mixer to turn all the air exiting the cooling fins and mix with a first portion of fuel. Therefore, the combustor according to the second embodiment may include a pre-mixer 142 substantially similar to the pre-mixer illustrated in FIG. 5, save that the ports are formed in the cooling channels 144 rather than individual cooling tubes 44. In addition, this alternative embodiment may include a combustion inhibitor to assist in eliminating combustion in the pre-mixer 142.

It will be further understood that the heat exchanger, according to the present invention, does not require the use of individually enclosed regions or modular portions. Rather the heat exchanger may be formed of a plurality of sheets, such as corrugated sheets. A first set of these sheets are oriented relative to one another to form a plurality of columns. The first set of sheets include a catalyst coated on a side facing an associated sheet, such that the interior of the column includes the catalyst to contact the airflow. In this way, the catalyst need not be coated on the interior of a closed space, but rather the space is formed after the catalyst is coated to form the catalyst pathway. Operatively associated with the first set of sheets is a second set of sheets, defining a second set of columns disposed at least partially between the first set of columns. Thus, in a manner similar; the heat exchanger 145, heat exchange columns and cooling columns are formed. These then form the catalyst pathway and the cooling pathway in operation of the combustor.

Figure 10:
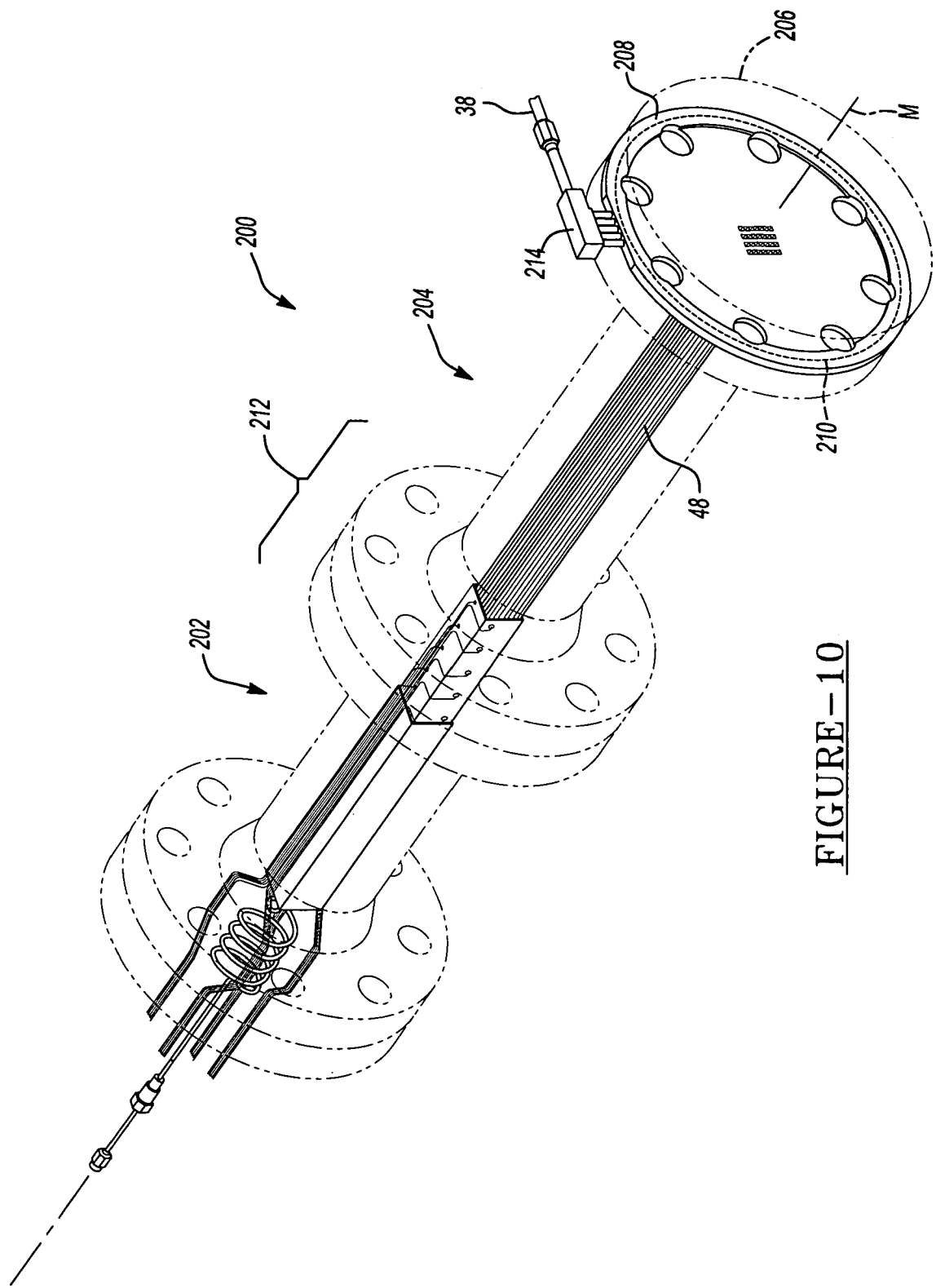
FIG. 10 is a combustor according to a various embodiment.

With reference to FIG. 10, a combustor assembly 200 according to various embodiments is illustrated. The combustor assembly 200 is generally oriented along a central axis M. The combustor assembly 200 may include a pre-mix section 202, a pre-combustion or catalyst section 204, and a main combustion chamber or area 206. The main combustion chamber 206 is generally positioned downstream of an injector plate 208. The injector plate 208 may be at least removable from the combustor assembly 200 for easy changing and testing. The heat exchange tubes 48 also provide a pathway for the hot oxidizer or hypergolic air, or air that becomes hypergolic, before it exits the main injector plate 208. Nevertheless, the heat exchange tubes 48 generally are interconnected with the main injector plate 208 or a seal (not shown) to which the heat exchange tubes 48 are substantially brazed or fixed. The remaining portions of the combustor assembly 200 are substantially similar to the portions illustrated in FIGS. 1 and 2.

The selected oxidizer and a first portion of the fuel is mixed in the pre-mix section 202, in an area of overlap or heat exchange that is formed where the cooling tubes 44 overlap the heat exchange tubes 48 in an overlap section 212. Although the shape of the combustor 200 may be different than the shape of the combustor 14 illustrated in FIG. 2, the purpose and operation may be substantially similar. Nevertheless, the main injector plate 208 may be easily removed from the combustor assembly 200 through a local main fuel supply port 214. The main fuel line 38 is interconnected to the main injector plate 208 through the fuel supply port 214. Therefore, rather than supplying the fuel through the center of the combustor 200, the fuel is provided near the main injection plate 208 for easy removal of the main injector plate 208.

Figure 11:
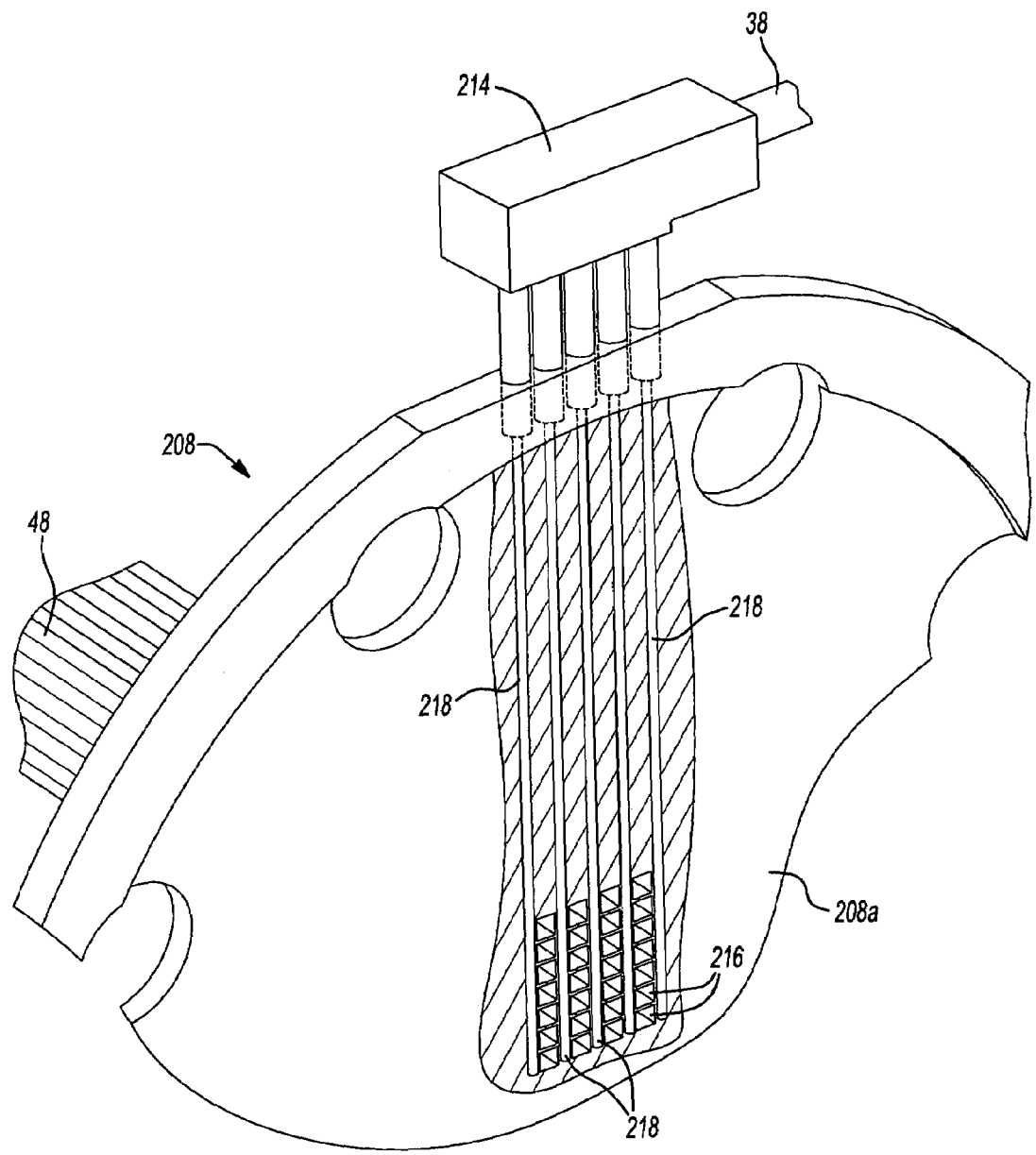
FIG. 11 is a detailed partial cross-sectional perspective of an injector plate according to the embodiment of FIG. 10.

With continuing reference to FIG. 10 and additional reference to FIG. 11, where in FIG. 11 the outer portion of the combustor 200 has been removed to illustrate in detail the main injector plate 208. The main injector plate 208 defines a plurality of oxidizer pathways 216 through which the heated oxidizer flows from the heat exchange tubes 48. The heated oxidizer flows into the main combustion area 206 which is defined as the area downstream of the downstream face 208a of the main injector plate 208. Fuel is provided to the areas between the oxidizer pathways 216 through a plurality of injector plate fuel pathways 218. The main injector plate fuel pathways 218 extend from the fuel port 214 to the areas between the oxidizer pathway 216 to injectors or the injector element 60.

With continuing reference to FIG. 11, the main injector plate 208 defines a plurality of the main injector plate fuel pathways 218 such that fuel may be provided to each of a plurality of areas between the oxidizer pathways 216. The main injector plate 208 defines a thickness appropriate to supply the fuel to the injection areas. The thickness of the injector plate 208 may be any appropriate thickness to meet various requirements. Nevertheless, the injector plate 208 provides the final pathway for the fuel as it flows to the injector areas to be injected into the combustion area 206.

Because the fuel port 214 is interconnected with the injector plate 206, the main fuel line 38 may be disconnected and the injector plate 208 removed from the combustor assembly 200. This may be done for any appropriate reason, such as cleaning the injectors in the injector plate 208, changing the injectors in the injector plate 208, or any other appropriate reason. Therefore, the heat exchange tubes 48 may not generally be fixed to the main injector plate 206, but rather fixed to a seal or second portion that is able to substantially seal with or engage the main injector plate 208 such that the oxidizers provided in the appropriate area.

The present invention thus provides an apparatus and method that virtually or entirely eliminates the creation of NOX emissions. Advantageously, this is accomplished without significantly complicating the construction of the gas powered turbine 10 or the combustors 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A turbine having a combustion system comprising:
a compressor adapted to produce compressed atmospheric air; and
a combustion system for mixing and combusting a fuel injected into the compressed atmospheric air to produce expanding gases,
said turbine being powered by the expanding gases; and
said combustion system comprising:
a first fuel supply to supply fuel to the compressed atmospheric air;
a heat exchanger comprising a catalyst section comprising a catalyst disposed within said catalyst section, and a cooling tube wherein the compressed air and the fuel flow through said catalyst section and the compressed air flows through the cooling tube; and
a second fuel supply to supply fuel to the compressed atmospheric air after the compressed atmospheric air has passed through said catalyst section.

2. The turbine of claim 1, wherein:
said catalyst section comprising a plurality of catalyst members, each extending parallel to a first axis;
said cooling tubes further comprising a plurality of cooling tubes, each extending parallel to a second axis generally parallel to said first axis for at least a selected length;
said catalyst members arranged to form a plurality of columns spaced transversely to said first axis and defining a plurality of channels; and
said cooling tubes arranged in a plurality of columns and extend a distance along said catalyst members and generally perpendicular to said channels.

3. The turbine of claim 2, said catalyst members, said cooling tubes and said channels defining a flow path for the compressed atmospheric air such that the compressed atmospheric air is adapted to receive thermal energy from said catalyst members by flowing through said channels and said cooling tubes.

4. The turbine of claim 2, further comprising:
thermal energy transfer to the compressed atmospheric air as the compressed atmospheric air flows through said heat exchanger such that the fuel from the first fuel supply is combusted via said catalyst.

5. The turbine of claim 2, further comprising:
a heat exchange area;
a pre-mix area for mixing a first portion of the fuel with the air; and
a main injector area comprising at least one injector for said catalyst members, wherein:
a second portion of the fuel is mixed with the compressed atmospheric air in said main injector; and said main injector adapted to mix the second portion of fuel with the compressed atmospheric air such that the temperature throughout the area of the injector is substantially equal.

6. The turbine of claim 5, said main injector operable to inject a fuel, comprising at least one of a hydrogen, a methane, a natural gas, a carbon based fuel, a Synthesis gas, and combinations thereof.

7. The turbine of claim 5, said main injector injecting at least two different fuels at different times with substantially similar results.

8. The turbine of claim 5, said at least one injector comprising a plurality of injectors, said plurality of injectors substantially mixing at least one of a methane fuel, a hydrogen fuel, a Synthesis fuel, a natural gas fuel, and combinations thereof with the oxidizer.

9. The turbine of claim 1, said catalyst section comprising a catalyst channel.

10. A combustion system for a turbine, comprising:
a compressor adapted to produce compressed atmospheric air; and
a combustion system for mixing and combusting a fuel injected into the compressed atmospheric air to produce expanding gases;
said turbine being powered by the expanding gases; and
said combustion system comprising:
  a first fuel supply to supply fuel to the compressed atmospheric air;
  a heat exchanger comprising a catalyst section comprising a catalyst disposed within said catalyst section, wherein the compressed air and the fuel flow through said catalyst section;
  a second fuel supply to supply fuel to the compressed atmospheric air after the compressed atmospheric air has passed through said catalyst section;
  said catalyst section comprising a plurality of catalyst members, each extending parallel to a first axis;
  said heat exchanger further comprising a plurality of cooling tubes, each extending parallel to a second axis generally parallel to said first axis for at least a selected length;
  said catalyst members arranged to form a plurality of columns spaced transversely to said first axis and defining a plurality of channels; and
  said cooling tubes arranged in a plurality of columns and extend extending a distance along said catalyst members and generally perpendicular to said channels.

11. The combustion system of claim 10, said catalyst members, said cooling tubes and said channels defining a flow path for the compressed atmospheric air such that the compressed atmospheric air is adapted to receive thermal energy from said catalyst members by flowing through said channels and said cooling tubes.

12. The combustion system of claim 10, further comprising:
thermal energy transfer to the compressed atmospheric air as the compressed atmospheric air flows through said heat exchanger such that the fuel from the first fuel supply is combusted via said catalyst.

13. A combustion system for a turbine, comprising:
a compressor adapted to produce compressed atmospheric air; and
a combustion system for mixing and combusting a fuel injected into the compressed atmospheric air to produce expanding gases,
said turbine being powered by the expanding gases;
said combustion system comprising:
  a first fuel supply apparatus to supply fuel to the compressed atmospheric air;
  a heat exchanger system comprising a catalyst section comprising a catalyst disposed within said catalyst section, wherein the compressed air and the fuel flow through said catalyst section;
  a second fuel supply apparatus to supply fuel to the compressed atmospheric air after the compressed atmospheric air has passed through said catalyst section; and
  said catalyst section comprising a plurality of catalyst members;
a pre-mix area interconnected with the heat exchanger system for mixing a portion of the fuel from the first fuel supply apparatus with the compressed atmospheric air; and
a main injector member interconnected with the heat exchanger system and including at least one injector operably coupled to said catalyst members;
a portion of the fuel from the second fuel supply apparatus being mixed with the compressed atmospheric air in said main injector member; and
said main injector member adapted to mix the portion of the fuel from the second fuel supply apparatus with the compressed atmospheric air such that a temperature throughout the main injector member is substantially equal.

14. The combustion system of claim 13, said main injector member operable to inject a fuel, comprising at least one of a hydrogen, a methane, a natural gas, a carbon based fuel, a Synthesis gas, and combinations thereof.

15. The combustion system of claim 13, said main injector member injecting at least two different fuels at different times while maintaining the temperature throughout the main injector member substantially equal.

16. The combustion system of claim 13, said at least one injector comprising a plurality of injectors, said plurality of injectors substantially mixing at least one of a methane fuel, a hydrogen fuel, a Synthesis fuel, a natural gas fuel, and combinations thereof with the oxidizer.

* * * * *